Aug. 23, 1927.

F. P. McBERTY 1,640,244

ELECTRIC WELDING APPARATUS

Filed July 20, 1921

F. P. McBERTY

1,640,244

ELECTRIC WELDING APPARATUS

Filed July 20, 1921

F. P. McBERTY

ELECTRIC WELDING APPARATUS

Filed July 20, 1921

Inventor
F. P. McBerty
By A. S. Pattison
Attorney

Patented Aug. 23, 1927.

1,640,244

UNITED STATES PATENT OFFICE.

FRED P. McBERTY, OF WARREN, OHIO.

ELECTRIC WELDING APPARATUS.

Application filed July 20, 1921. Serial No. 486,113.

My invention relates to improvements in apparatus for and process of electric welding, and pertains to an apparatus and process employing a step by step welding operation.

My improved apparatus and process is capable of being employed for producing a continuous welded seam by a step by step process, or for producing a multiplicity of spot welds by a step by step process.

In electrically welding continuous welded seams, prior to my improved process and apparatus, such welding was done by a continuous welding operation. This has been found to involve many difficulties, due primarily to the buckling of the sheets being welded; the scale on the sheets and to the fact that the roller electrodes pulled upon the soft metal, making an uneven and rough weld, and in thin material at times breaking the soft metal.

By means of my improved process and apparatus in which I utilize a step by step welding operation, the welding takes place while the roller electrodes are quiet, and then the material and faces of the roller electrodes move a short distance, stop and another weld made, this being repeated in quick succession, effecting a continuous electrical welded seam and avoids the difficulties found in making a continuous weld by a continuous movement of the material and the faces of the roller electrodes.

My improved apparatus and process further involves the automatic closing of the welding circuit while the material and electrodes are stationary, and automatically breaking the welding circuit before the material and electrodes move.

Furthermore by my improved process and apparatus, I am enabled to utilize roller electrodes for spot welding and to make a succession of spot welds any desired distance apart, and make two or more parallel series of electric spot welds, and I am able to produce two or more continuous parallel seam welds.

I find in practice that successful welds may be made as rapidly as one hundred per minute and yet produce either a smooth continuous welded seam, or a plurality of separated spot welds.

The machine here shown is particularly designed to weld together two lapping previously formed parts, which when welded compose what is known in the art as "metal timber," and to connect these parts by either one line, or parallel lines of spaced spot welds, or by one, or parallel seam welds, and in both instances utilizing my improved process comprising a step by by step welding.

My improved welding apparatus comprises several improvements which will appear from the following description and illustrations.

The apparatus here shown, comprises two welding mechanisms adapted to conjointly operate for producing either parallel welded seams or parallel series of spot welds.

For convenience in description, one welding mechanism A, I term the right hand mechanism, and B, the left hand mechanism. These two welding mechanisms are identical and the description of welding mechanism A will apply to the welding mechanism B, and like reference letters will be applied to both.

Figure 4:
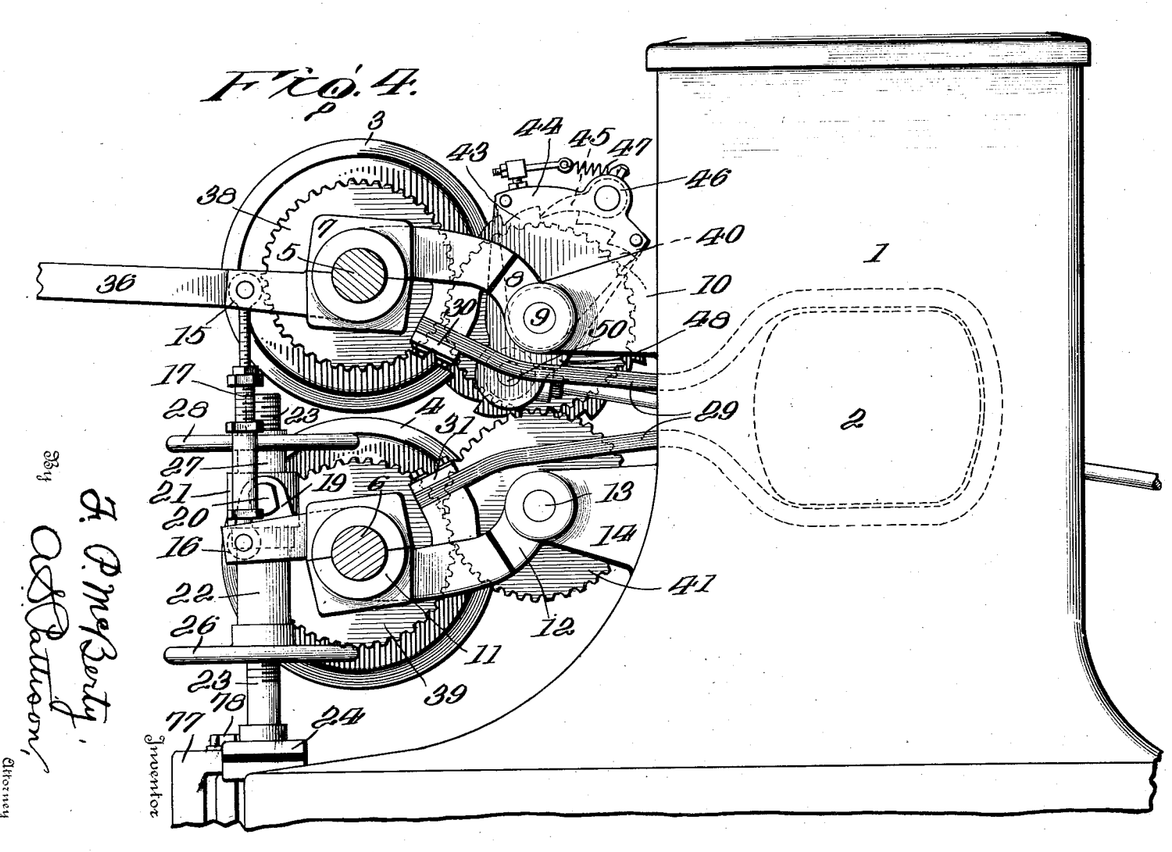
Fig. 4 is a sectional view on the line 4—4 of Figure 1.

Each of these mechanisms A and B, comprise the following mechanism and operation:—A transformer housing 1, encloses any well-known form of welding transformer 2 (shown in dotted lines, Fig. 4).

The welding electrodes comprise an upper copper roller 3 and a lower copper roller 4. The upper roller electrode 3 is attached to a shaft 5, and the lower electrode 4, is attached to a shaft 6. The shaft 5 is journaled in a suitable housing 7, and the inner end 8 of this housing is pivoted at 9 in a bracket 10, which extends outward from the transformer housing 1. The lower shaft 6 is journaled in a suitable housing 11, the inner end 12 of which is pivoted at 13 to a bracket 14, also extending outward from the transformer housing 1. These journals 7 and 11 are adjustable towards and away from each other turning on their pivots 9 and 13, for the purpose of adjusting the distance apart of the adjacent peripheries of the electrode rollers 3 and 4; and the housing 11, and its roller electrode 4 are vertically adjustable for a purpose which will be described hereinafter.

The upper housing 7 is provided with two pairs of outwardly projecting arms 15, and the lower housing 11 is provided with two corresponding outwardly projecting pairs of arms 16. The arms 15 and 16 are connected by adjustable rods or members 17 of the turnbuckle type for effecting the adjustment of the housing of the roller electrodes, previously referred to. Also projecting outward from the lower bearing housing 11, are two pairs of arms 18, between which the lower ends of depending links 19 are pivoted, while the upper ends of these links 19 are pivoted at 20 to a vertically adjustable housing 21. This housing 21 is adjustable by means of a lower housing 22, into which a screw-threaded rod 23 extends, the lower end of the screw-threaded rod being supported in a suitable socket or seat 24, which is secured to a base 25 of the mechanism. A hand wheel 26 is attached to the housing 22 for turning it on the screw-rod 23. This screw-rod 23 passes through the housing 21 and into a shorter upper housing 27, and attached to this housing 27 is a hand wheel 28. By means of this construction, the lower electrode 4 and its bearing housing 11 is vertically adjustable and as it moves it carries with it the upper electrode 3 and its housing 7. At the same time the upper electrode is adjustable towards and away from the lower electrode 4 by the turnbuckle arrangement 17. By means of the housings 22 and 27 and the hand-wheels 26 and 28 carried thereby, the lower housing 11 and its electrode 4 can be adjusted vertically and locked in its adjusted position. The reason for adjusting these electrodes will be explained presently.

A suitable welding current lead or conductor 29 passes around the transformer 2, as shown in Fig. 4, and the ends of this conductor are connected respectively to the upper and lower housings at the points 30 and 31, and thus electrically connecting the electrode rollers 3 and 4 with the welding current of the transformer.

Figure 1:
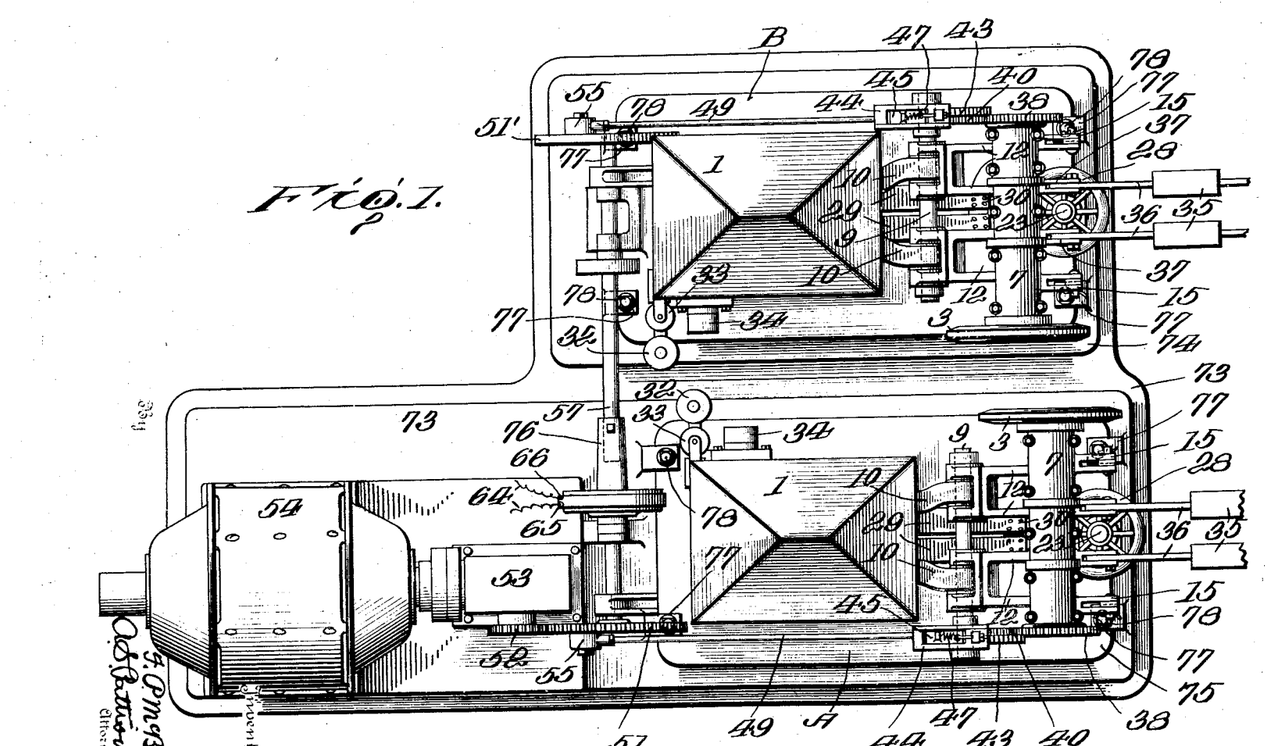
Fig. 1 is a top plan view of my improved apparatus which employs my step by step welding process.
Figure 2:
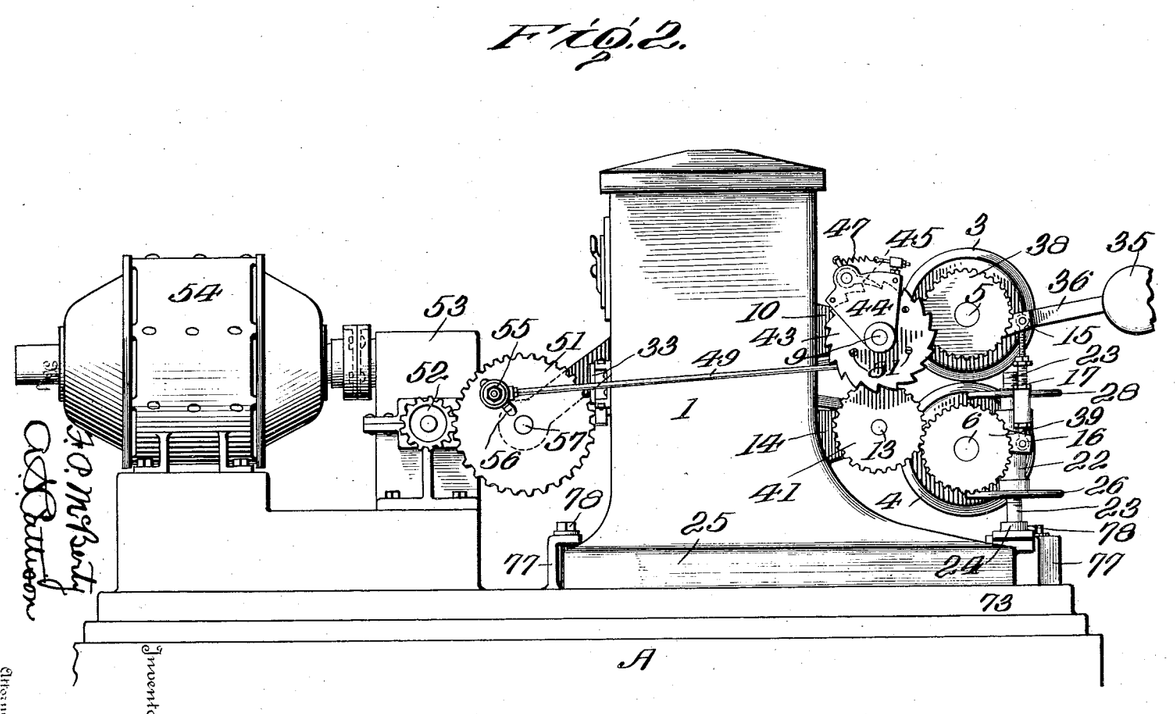
Fig. 2 is a side elevation of Fig. 1, looking towards the right hand mechanism.
Figure 5:
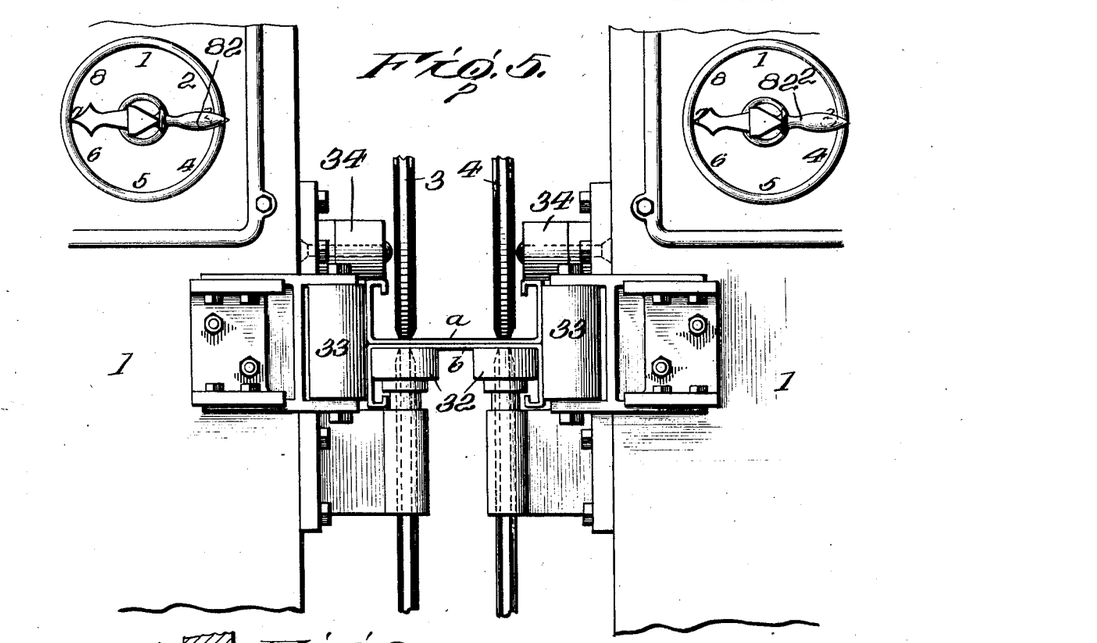
Fig. 5 is a separated rear elevation to show the electrodes, the work being welded, and the guides therefor.

Referring now particularly to Figs. 1 and 5, the rear inner sides of the transformer housing 1 are provided with suitable supporting and guiding members. These supporting members comprise horizontal rollers 32 and the guiding members comprise vertical rollers 33 and upper horizontal rollers 34. It will be understood that these guiding and supporting devices will be constructed according to the character of the work being welded. In the present case the object being welded is what is known in the art as "metal timber" and as here shown, it comprises an upper approximately U-shaped member $a$ and a correspondingly shaped lower member $b$, which are placed back to back, as shown, and between the upper and lower electrodes 3 and 4.

The pressure of the electrodes on the work being welded is controlled by weights 35, which are adjustable on the outer ends of the levers 36, the inner ends of the levers being clamped between two pairs of ears 37, which extend outward from the upper housing 7.

The supporting rollers or members 32 fix the horizontal plane in which the metal timber or other article being welded is held and travels. This article is caused to move by and when the upper and lower electrodes rotate and is held stationary between the electrodes while the electrodes are stationary. It is, therefore, essential that the upper peripheries of the lower electrodes 4 should be approximately in the horizontal plane, corresponding to the horizontal plane of the top of the work supporting members 32. Therefore by the previously described adjusting means the lower roller is vertically adjustable to bring it to the proper horizontal plane, and the upper electrode rollers 3 are vertically adjustable in respect to the lower electrodes 4, according to the thickness of the plates or work that is being welded. Another reason for the adjusting arrangement 17 for the upper electrode rollers 3 is to prevent the rollers contacting when the work passes from between them during the operation of the machine and thus preventing a short circuiting of the current by contact of the upper and lower electrodes, which would happen if there were no means to prevent them from coming together. A further reason of the adjustability of the roller electrodes is, that after long continued use the welding peripheries of the rollers become roughened and worn and it is necessary to redress or machine them in order to obtain efficiency of welding. This redressing or machining reduces the diameters of the electrode rollers and adjustment thereof is necessary to bring them to their proper positions for welding.

In carrying out my present improvement the electrode rollers 3 and 4 are moved intermittently, or step by step, and the welding current is turned on while the rollers and work are stationary, and the welding current is turned off before the rollers or work are moved a step forward. In this way the welding takes place while the roller electrodes and the work are not moving, and there is no current passing through the electrodes or the work when the step movement takes place.

Step by step mechanism.

I will now explain how the step by step movement of the roller electrodes and the work is obtained.

The upper and lower shafts 5 and 6 extend through their housings 7 and 11, the upper shaft carrying a gear-wheel 38 and the lower shaft carrying a gear-wheel 39. A gear-wheel 40 (see Fig. 4) meshes with the gear-wheel 28, the gear 40 with an idler gear 41 and this idler gear in turn meshes with the gear 39. The gears 38, 39, 40 and 41 are all of the same diameter. The gear 40 may be termed the propelling gear. This gear is mounted on the same shaft and connected with the gear 40 is a ratchet wheel 43. An approximately U-shaped ratchet housing 44 is also journaled on the shaft 92 and this housing carries a ratchet 45 pivoted in the top of the housing 44 at the point 46, whereby its free end is held in engagement with the ratchet teeth of the ratchet wheel 43 by a suitable spring 47. The inner end of the housing 44 has a depending arm 48, to which a reciprocating rod or pitman 49 has its end pivoted as at 50. When this rod or pitman 49 moves back and forth, it causes the ratchet wheel 43 to intermittently rotate, causing the gears 38, 39, 40 and 41 to correspondingly rotate and thereby intermittently rotates the electrode rollers 3 and 4 intermittently or step by step.

The opposite or rear end of the pitman or rod 49 is pivoted eccentrically to a gear-wheel 51, and this gear-wheel 51 is rotated by a pinion 52, which in turn is driven by a suitable mechanism (not shown) in the housing 53, this mechanism being driven by a variable speed electric motor 54. The outer end 55 of the pitman 49 is adjustable towards and away from the axis of the wheel 51 through the medium of the usual slot construction 56, whereby the stroke of the pitman 49 is regulated and thereby the movement of the housing 44 correspondingly regulated so that the ratchet 45 will move the ratchet wheel 43 one or several teeth at each movement of the pitman 49.

The gear 51 is attached to a shaft 57, which as shown in Fig. 1 extends across and operatively connects the welding mechanisms A and B, the opposite end of the shaft 57 carrying a gear and rod connection 49, 51, 55, and 56 already explained, and in the same manner causes the intermittent or step by step movement of the roller electrodes of the welding mechanism B. It will also be seen from this description that the welding electrodes of both welding mechanisms move at the same time and move the same distance.

Figures 6, 8:
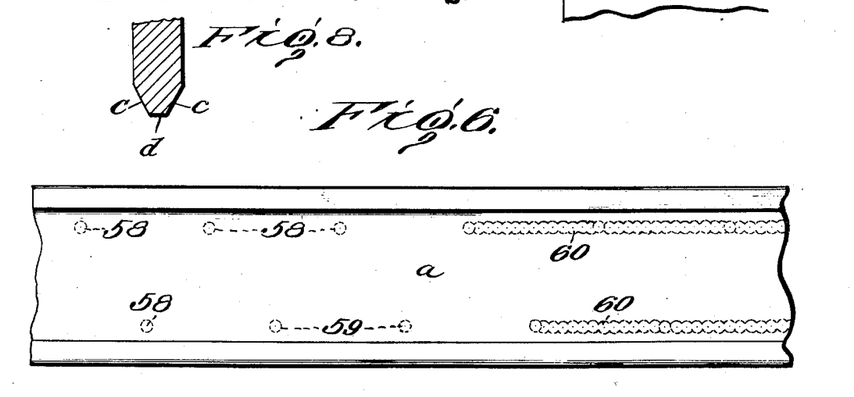
Fig. 6 is a top plan view of a section of metal timber spot welded by my improved method and apparatus.
Fig. 8 is a cross-section showing the shape of the welding portion of the roller electrodes.

In Fig. 6 is shown a plan view of the metal timber, in which the two parts of the timber may be connected by either a parallel series of separated spot welds 59, or by welds so close together as to form a continuous weld, as shown at 60, Fig. 6.

I desire it to be understood that my improvement will be practiced when only a single series of separated spot welds are produced, or when a single continuous seam is produced by making the welds so close as to constitute a continuous weld.

Welding circuit controlling mechanism.

The two welding mechanisms A and B are caused to conjointly operate in their step by step welding by the fact that the shaft 57 is common to and operates both welding mechanisms. This shaft 57 carries a commutator C, which controls the closing and breaking of the welding circuit.

Figure 7:
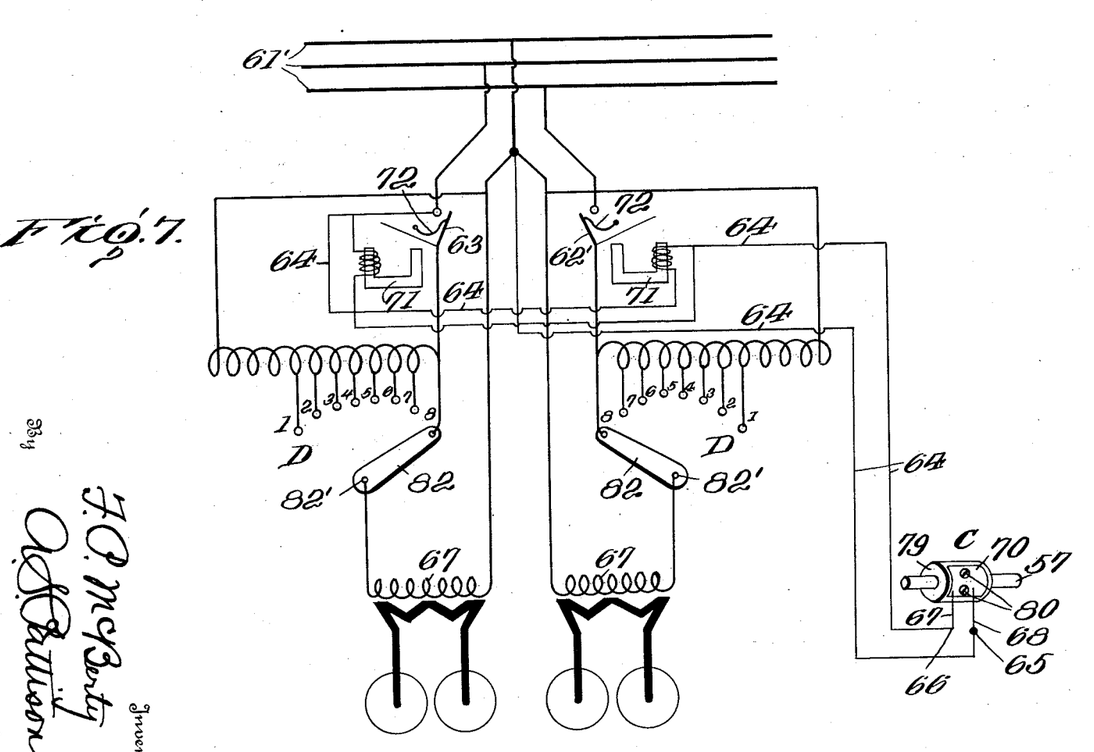
Fig. 7 is a diagrammatic view showing the electric circuits and the manner of closing and breaking the welding circuit for the step by step welding.

Referring now particularly to the diagrammatic view Fig. 7, the current of the main circuit 61 flows through the transformer 67, which operates in any well-known manner for producing a current having a low voltage and high amperage which is necessary to produce a welding current. The operation of the transformer is so well-known to those skilled in the art that no description thereof is necessary.

For the purpose of understanding my present improvement involving making and breaking of the welding circuit, it is sufficient to say that the welding circuit is controlled by magnetically operated switches 62, and 63, which are located respectively in the positive and negative sides of the circuit. A shunt circuit 64 has its terminals 65 and 66 connected respectively with the brushes 67 and 68. These brushes have their free ends adapted to engage a contact plate 70 of the commutator C, which is carried on the shaft 57. Located in this shunt circuit is a magnet 71, which when magnetized closes the switches 62 and 63 in the welding circuit, and when not magnetized these switches are thrown into open or breaking positions by any suitable form of springs 72.

The shaft 57 is continuously rotating and the contact plates 69 and 70 control the closing and breaking of the shunt circuit 64, and the closing and breaking of this shunt circuit correspondingly closes and breaks the welding circuit through the medium of the magnet 71 and the switches 62 and 63.

The length of time that the welding circuit is closed depends upon the length of the contact plates 69 and 70, and these plates are detachable from the insulated portion 79 of the commutator by screws 80, so that either shorter or longer points may be provided according to the character of the welding being done. That is to say the length of time that the current is on depends upon the thickness of the pieces of the work being welded. It requires a longer time for relatively thicker plates than it does for thinner plates. The length of time the welding circuit is closed can also be provided for in some instances by regulating the speed of the shaft 57, and this can be controlled by the speed of the electric or other motor 54.

It will be observed that the step by step feeding mechanism, previously described, and the commutator C are both operated by the same shaft 57. The make and break plates 69 and 70 of the commutator C, are so positioned on the shaft 57 that they contact the brushes 67 and 68 for closing the shunt circuit when the pitman rod 49 is moving forward and the ratchet 45 slipping over the ratchet teeth of the wheel 43. This means that the electrode welding rollers of the welding mechanisms are stationary when the ratchet 45 is slipping over the ratchet teeth and at the same time the shunt circuit 64 and the welding circuit 81 are closed. The contact plates 69 and 70 are of such length that they pass out of contact with the brushes 67 and 68 before the ratchet 45 begins its pushing action on the ratchet wheel 43 and, therefore, before the welding rollers and the work being welded are moved.

From the foregoing description, it will be understood that the shunt and welding circuits are closed, while the welding rollers and work are stationary, and are open when the welding rollers and the work are moved. In this way there is a step by step welding, the welding taking place while the welding electrodes and the work are stationary. This operation causes an intermittent movement of the welding rollers and the work, as will be readily understood.

The ratchet teeth on the ratchet wheel 43 will be of a length equal to the shortest distance the welding rollers and work are to be moved. That is to say, if the machine is used for making a continuous seam weld, the teeth will be of a size that will cause the welds to overlap, and the movement of the ratchet and ratchet wheel will be limited by adjusting the connection of the pitman rod 49 close to the axis of the wheels 51, and 51'. For the purpose of adapting the welding mechanisms for close or separated welds, which may, in some instances, require a ratchet wheel 45 of relatively fine or coarse teeth, the ratchet wheel 43 is detachable from its gear-wheel 40, by means of screws 81. This construction permits ratchet-wheels with either coarse or fine teeth to be used according to the character of weld desired. On the other hand, a ratchet wheel 70 may be used with sufficiently fine teeth for the close welds and the separated welds provided for by the adjustment of the connection 55 of the pitman rod 39. For convenience in construction, as well as operation, the ratchet will preferably be made separate from its gear wheel 40, though, of course, they may be permanently connected without affecting my invention.

Where, as here, two welding mechanisms are conjointly operating to produce a certain product, the shunt and welding circuits are arranged in parallel so that the single commutator C takes care of the making and breaking of the shunt and welding circuits.

Figure 3:
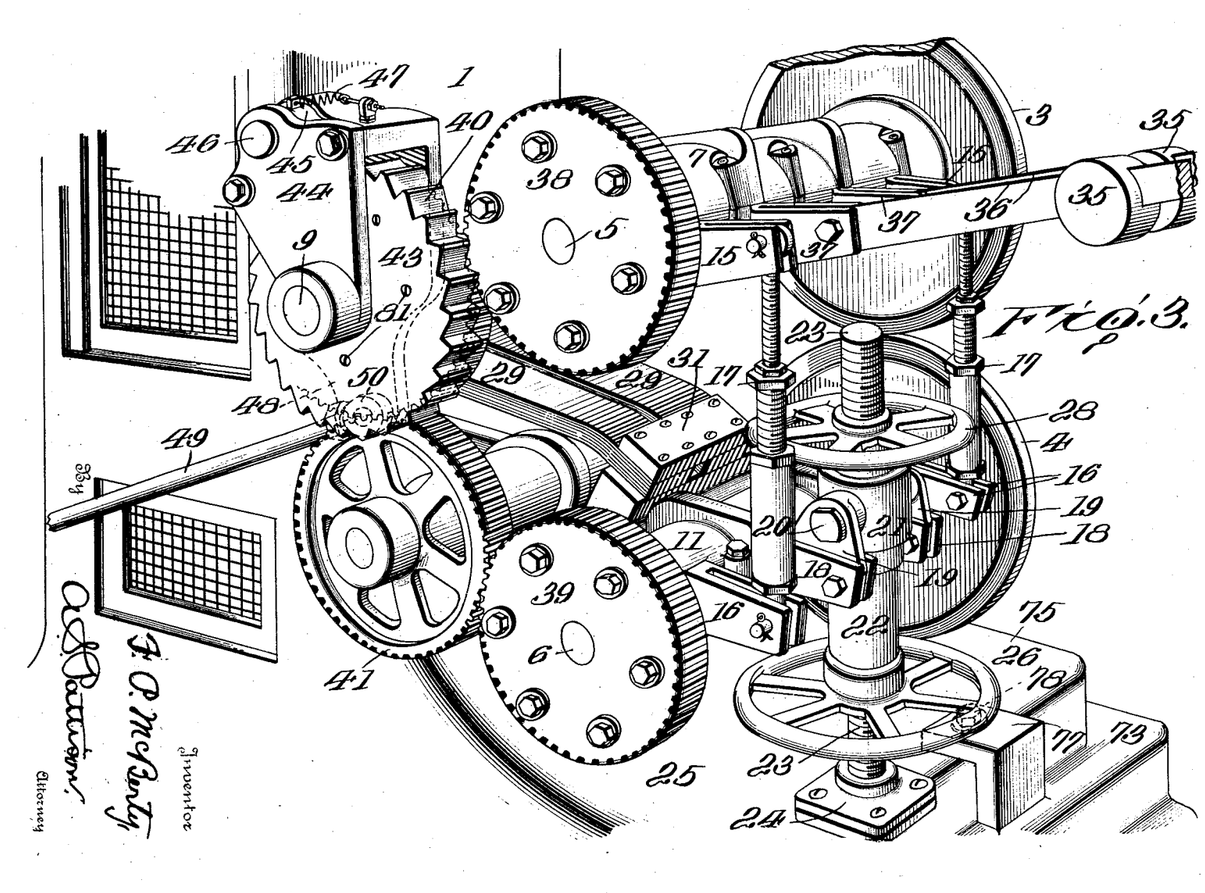
Fig. 3 is an enlarged detached perspective view showing the roller electrodes; the means for adjusting the electrodes; the means for holding the electrodes against the work with pressure; the electric leads or conductors and the gear and ratchet mechanism for causing the electrodes to move step by step.

Attention is directed to the fact that the staggering positions of the two series of welds shown in Fig. 6, is accomplished by setting one of the welding mechanisms A and B in advance of the other, so that one set of electrode welding rollers is in advance of the other. In this particular machine, in full size, the welding rollers of one machine are in advance of the welding rollers of the other machine between five and six inches, but, of course, this may be varied. In fact, there is a main base 73 upon which the pieces 74 and 75 of the welding mechanisms A, B, rest and are adjustable thereon, in a lateral direction, for the purpose of varying the distance between the electrode rollers of the two welding mechanisms and to enable this lateral adjustment the shaft 57 has a telescoping connection 76. The welding mechanisms may be clamped in their adjusted positions in any desired manner, such for instance, by inverted L-shaped brackets 77, which extend from the main base 73 and extend over the top of the machine bases, as shown clearly in Fig. 3, and clamping bolts 78 pass through the brackets and engage the machine-frame.

It is well understood by those skilled in this art, that the strength of the welding current is controlled by regulating or controlling transformer. This is done in a manner well understood by those skilled in this art and will need no description, except to say that the transformers are controlled in the usual manner by a hand-operated index-lever 82, one of which is provided for each transformer. In this way the current for the roller electrodes for the two machines can be regulated to the same strength where the part of the work operated upon is the same thickness, whereas if the part of the work operated upon by one set of electrode rollers is thicker than that of the other set of electrode rollers, then the transformers will be set to provide a proper welding current for the different thicknesses of metal operated upon by the respective welding rollers or electrodes.

So far as I am aware, what is known as "point" electrodes have always been used for what is known in the art as "spot welding." In this form of electrode for spot welding, the points quickly become so worn or marred that they have to be dressed every hour or two if the machine is being continuously used. So far as I am aware, I am the first to use roller electrodes for spot welding. This form of electrode has the advantage over the point electrode in that there is a long peripheral surface for welding and in that the welding point of the roller electrode is not the same for the repeated welds, and I find that in commercial use the roller electrodes can be used continuously for long periods of time without becoming marred or worn to necessitate the redressing or machining. In fact, I find that the roller spot welding electrodes can be commercially used from one to two months without the necessity of redressing or machining. This enables the roller electrodes to be used for the continuous operation for long periods of time in automatically operated machines, which is not the case with the previously used "pointed" electrodes for spot welding. Therefore, one feature of my present improvement is a roller spot welding electrode. The specific form of roller which I use for spot welding has tapered portions, preferably at both sides, adjacent its periphery, tapered as at $c$, forming a peripheral welding point or surface $d$, whereby the roller electrode in cross-section substantially corresponds with the longitudinal section of the "point" electrode heretofore used for spot welding.

While I have here shown two conjointly operating welding mechanisms for producing a specific kind of work, I desire it to be understood that my generic improvement is not limited to the use of two conjointly operated welding mechanisms. It will be understood by those skilled in the art that many of the generic principles of my process and welding mechanism can be carried out in a single welding mechanism, without departing from the scope of my broader invention.

In a machine for the type of work here disclosed, it is desirable to control the main welding switch by a shunt switch which uses a very small amount of current to actuate the welding switch, for the purpose of avoiding the flashing due to the breaking of the heavy amperage of the primary or welding circuit, which would soon destroy the commutator brushes. On machines for doing a very light work, however, the primary or welding circuit can be controlled directly by the commutator.

It will be understood by those skilled in the art that my improved process and apparatus for the step by step process of welding, can be used for making continuous seams for all kinds of work. It may be used for making a continuous welding seam in tubes, or for welding bottoms in tubes, or welding bottoms in receptacles of any kind. In some kinds of continuous seam welding with the step by step process, it will be necessary to have the roller electrodes so arranged that they can operate upon the parts to be seam welded. I desire it also to be understood either the spot welding or the continuous seam welding of my improved process may be used with a single roller electrode, the other electrode being of a non-roller form, such as a bar or mandrel, though I prefer, where it is possible and the character of the work will permit, to use two co-operating roller welding electrodes.

So far as I am aware, a step by step welding process in which the welding takes place only while the roller electrodes are stationary in the manner heretofore described, has not been used previous to my invention thereof. This process has proven of great value in commercial seam welding and also in commercial rapidly succeeding spot welding work. In find that the welds can be made as rapidly as one-hundred a minute, either for continuous seam welding or for separated spot welding, thus making the movement of the work sufficiently rapid to be economical. In a machine using my step by step process, which enables automatic operation, it is only necessary for the operator to feed the work to the machine, and the work is automatically fed through the machine and the welding automatically accomplished any desired distance apart if spot welding is to be done, or a continuous seam produced, as may be desired.

It will also be understood that my process and apparatus can be operated by any suitable desired form of motor, or, in fact, can be run by a belt and pulley, but I prefer to operate the machine by an electric motor in the manner herein shown and described.

Referring again to Fig. 7, I there show a multi-phase alternating current circuit which I prefer to use, since with this the load can be put over two-phases of the circuit and have more balancing effect, though I desire it to be understood that a single phase circuit could be designed and used.

In Fig. 7, D, D, diagrammatically represent what is commonly known as an "autocoil" having a series of taps on the windings and 82 are the rheostat switches for the transformer. These switches are pivotally connected at 82' with the primary windings of the welding transformers and their opposite free ends adapted to contact with the various taps 1 to 8, corresponding to the dials on the transformers, thus giving a different voltage of the primary windings of the welding transformer. In this way, as previously stated, the strength of the welding current is controlled.

I desire it also to be understood that the magnetically operated switches 62' and 63 could be connected in series should it be desired, but I prefer to have it in parallel. Again, the induction coil could be mounted in the main circuit of the primary or welding transformer, instead of the "auto-coil" and get practically the same result. Those skilled in the art will understand that there are various methods, whereby these connections could be changed without departing from the spirit and scope of my invention and obtain the same results.

While I have shown the switches 62' and 63 located in a shunt circuit and operated by the commutator C, I desire it to be understood that these welding switches could be operated mechanically by a cam or other device on the drive-shaft 57, instead of electrically operated by the shunt circuit and its switches.

Having thus described my invention, what I claim and desire to secure by Letters Patent is:—

1. An electric welding machine, comprising two welding electrodes, one of which is a roller between which the metal pieces to be welded are held and moved, means for intermittently moving the pieces and the roller electrode, a welding circuit including said electrodes, means for intermittently moving the roller electrode and the pieces to be welded, and means for turning on and off the welding current while the electrode and pieces are substantially stationary.

2. An electric welding machine comprising two welding electrodes, one of which is a roller between which the metal passes to be welded are held and intermittently moved, means for intermittently moving the pieces and the roller electrode, a welding circuit including the said electrodes, and means for turning on the welding current and cutting off the said current while the pieces and the roller electrode are stationary.

3. An electric welding machine, comprising two electrodes, one of which is a roller between which the metal pieces to be welded are held and moved, means for intermittently moving the pieces and roller electrode, a welding circuit including the electrodes and means for closing the welding circuit while the roller electrode is stationary and breaking the circuit when it is moved.

4. An electric welding machine comprising two welding electrodes, one of which is a roller between which the pieces to be welded are held and moved, means for intermittently moving the pieces and the roller electrode, a welding circuit including the electrode, means operatively connected with the intermittently moving mechanism for closing the circuit while the pieces and the roller electrode are stationary and breaking the circuit when they are moved.

5. An electric welding machine, comprising two co-operating roller electrodes, means for simultaneously and intermittently moving the roller electrodes the same distance, a welding circuit including the said electrodes, and means for closing the circuit while the electrodes are stationary and breaking the circuit when the electrodes are moving.

6. An electric welding machine, comprising two co-operating roller electrodes between which the pieces to be welded are held and moved, means for maintaining the pieces between the rollers under welding pressure, means for intermittently and simultaneously moving the electrodes the same distance, a welding circuit including the electrodes and means for closing the circuit while the electrodes are stationary and breaking the circuit when the electrodes are moving.

7. An electric welding machine comprising two co-operating roller electrodes between which the pieces to be welded are held under welding pressure, means for intermittently moving the electrodes, a welding circuit including the electrodes, and means operatively connected with the intermittently moving means adapted to close the circuit while the electrodes are stationary and breaking it before and holding it broken while they are moving.

8. An electric welding machine comprising two co-operating roller electrodes between which the pieces of metal to be welded are held under pressure, means for intermittently moving the roller electrodes, means for vertically adjusting the lower roller electrode, a welding circuit including the electrodes, and means for closing the circuit while the electrodes are stationary and breaking and holding broken the circuit when the electrodes are moving.

9. An electric welding machine, comprising two co-operating roller electrodes between which the pieces of metal to be welded are held under welding pressure, means for intermittently moving the electrodes, means for adjusting and holding the electrodes in vertical relation, a welding circuit including the said electrodes, and means for closing the circuit when the electrodes are stationary, and breaking the circuit when the electrodes are moved.

10. An electric welding machine, comprising two co-operating welding electrodes between which the pieces to be welded are held under welding pressure, means for adjusting and holding the electrodes in vertical relation, and means for vertically moving the electrodes together to fix the line of movement of the pieces to be welded, an electric welding circuit including the said electrodes, means for intermittently moving the electrodes, and means for closing the welding circuit while the electrodes are stationary and breaking the circuit when the electrodes are moved.

11. An electric seam welding machine, comprising a roller electrode, a welding circuit including the said electrode, means for moving the electrode step by step, and means for closing the said circuit only during the interruption of the rotary movement of the electrode.

12. An electric seam welding machine, comprising a roller electrode, means for rotating the electrode intermittently, a welding circuit including the said electrode, and automatic means for closing said circuit only during the interruption of the rotary movement of the electrode.

13. An electric welding machine comprising a rotary electrode, a welding circuit including the electrode, and means for keeping said circuit closed only during the inturruptions of the rotary movement of the roller electrode.

14. An electric seam welding machine, comprising an intermittently movable roller electrode, a welding circuit including the said electrode, means for closing the circuit while the electrode is stationary only and opening it when the electrode is moved, and means intermittently moving the electrode a distance not exceeding the area of the weld.

15. An electric seam welding machine, comprising two electrodes, one of which is a roller between which the pieces of metal to be welded are held under welding pressure, said roller electrode being intermittently movable, a welding circuit including said electrodes, means for closing the circuit while the electrode is stationary and breaking the circuit when it is moved and means for intermittently moving the pieces a distance not exceeding the extent of the weld.

16. An electric welding machine, comprising two electrodes, one of which is an intermittently rotatable roller electrode, between which the pieces to be welded are held under welding pressure, and means intermittently moving the pieces and roller electrode a distance not exceeding the extent of the weld.

17. An electric welding machine, comprising two co-operating roller electrodes, vertically movable bearings for the electrodes, means for adjusting the bearings vertically for positioning the electrodes in respect to each other, and means for vertically moving both the electrode bearings together, for the purpose described.

18. An electric welding machine, comprising two electrodes, one of which is a roller between which the pieces to be welded are held under welding pressure, a welding circuit including the electrodes, a ratchet mechanism operatively connected with the roller electrode to impart an intermittent rotary movement thereto, and means for closing the circuit only while the electrode is stationary and breaking the circuit when it is moved.

19. In an electric welding machine, comprising two electrodes, one of which is a roller, means for intermittently moving the roller electrodes, a welding circuit including the electrodes, means for closing the circuit while the roller electrode is stationary and breaking the circuit when it moves, and an operating member common to the intermittently moving means and circuit closing and breaking means whereby they operate in unison.

20. A multiple electric welding machine, comprising two welding mechanisms, each including a roller electrode, the electrodes adapted to engage the pieces to be welded at parallel points, means for intermittently moving the pieces and the electrodes of both mechanisms in unison and like distances, a welding circuit including the said electrodes and means common to the mechanisms for closing the circuit while the electrodes are stationary and breaking the circuit when they are moved.

21. A multiple electric welding machine, comprising two welding mechanisms positioned side by side, each mechanism including a roller electrode, the roller electrode of one mechanism being in advance of the other for the purpose described, means for intermittently moving the electrodes simultaneously uniform distances, a welding circuit including the said electrodes, and means common to both mechanisms for closing the welding circuit while the electrodes are stationary and breaking the circuit when the electrodes are moved.

22. An electric welding machine, comprising an intermittently movable roller electrode, means for intermittently moving the electrode, a welding circuit for the electrode, a shunt circuit, electrically operated make and break devices for the welding circuit and located within the shunt circuit, a commutator within the shunt circuit so arranged and timed to close the welding circuit when the roller electrode is stationary and break the welding circuit when the electrode is moved.

23. An electric welding machine, comprising a roller electrode, means for intermittently moving the electrode, a welding circuit including the electrode, a make and break switch within the welding circuit, a shunt circuit including a commutator and a make and break device for the welding circuit, the contacts of the commutator so positioned that the shunt circuit and the welding circuit are closed while the electrode is stationary and are opened when the electrode is moved.

24. A spot welding machine, comprising an intermittently movable electrode, means for moving the electrode intermittently, a welding circuit including the electrode, and means for closing the circuit only while the electrode is stationary and opening the circuit when it moves.

25. In welding apparatus, the combination of a pair of disk shaped electrodes, means for maintaining pressure between the said electrodes and the work, means for intermittently rotating one of the said electrodes, and means for supplying current to the said electrodes while in periods of rest, substantially as described.

26. In welding apparatus, the combination of a pair of disk shaped electrodes, means for maintaining pressure between the said electrodes and the work, means for intermittently moving work between said electrodes, and means for passing current through the work between the said electrodes while the work is at rest, substantially as described.

In testimony whereof I hereunto affix my signature.

FRED P. McBERTY.